US010220722B2

United States Patent
Lewis et al.

(10) Patent No.: US 10,220,722 B2
(45) Date of Patent: Mar. 5, 2019

(54) OPERATION OF COMBINED COOLING CIRCUIT FOR POWER ELECTRONICS AND BATTERY

(71) Applicant: FORD GLOBAL TECHNOLOGIES, LLC, Dearborn, MI (US)

(72) Inventors: Hamish Lewis, Troy, MI (US); Christian Brent Schoeneman, Southgate, MI (US); Kenneth J. Jackson, Dearborn, MI (US); Peter Rowling, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 245 days.

(21) Appl. No.: 15/243,393

(22) Filed: Aug. 22, 2016

(65) Prior Publication Data

US 2018/0050605 A1 Feb. 22, 2018

(51) Int. Cl.
| | |
|---|---|
| B60H 1/00 | (2006.01) |
| B60L 11/18 | (2006.01) |
| H02P 29/68 | (2016.01) |
| B60K 6/40 | (2007.10) |
| B60K 11/02 | (2006.01) |
| B60R 16/08 | (2006.01) |
| B60H 1/03 | (2006.01) |
| H01M 6/50 | (2006.01) |
| B60L 1/02 | (2006.01) |
| B60L 3/00 | (2019.01) |

(52) U.S. Cl.
CPC .......... *B60L 11/1874* (2013.01); *B60H 1/004* (2013.01); *B60H 1/00278* (2013.01); *B60H 1/03* (2013.01); *B60K 6/40* (2013.01); *B60K 11/02* (2013.01); *B60L 1/02* (2013.01); *B60L 3/003* (2013.01); *B60L 3/0046* (2013.01); *B60R 16/08* (2013.01); *H01M 6/5033* (2013.01); *H01M 6/5038* (2013.01); *H02P 29/68* (2016.02); *B60L 2240/34* (2013.01); *B60L 2240/525* (2013.01); *B60L 2240/545* (2013.01); *B60Y 2200/92* (2013.01); *B60Y 2306/05* (2013.01); *Y10S 903/951* (2013.01)

(58) Field of Classification Search
CPC ...... B60H 1/00278; B60H 2001/00307; B60L 11/1874; H01M 10/613; H01M 10/667
See application file for complete search history.

(56) References Cited

U.S. PATENT DOCUMENTS

| | | |
|---|---|---|
| 8,336,319 B2 | 12/2012 | Johnston et al. |
| 8,806,882 B2 | 8/2014 | Bennion et al. |

(Continued)

FOREIGN PATENT DOCUMENTS

DE 19542125 A1 5/1996

*Primary Examiner* — Len Tran
*Assistant Examiner* — Eric Ruppert
(74) *Attorney, Agent, or Firm* — David Kelley; Brooks Kushman P.C.

(57) ABSTRACT

A thermal management system for a vehicle includes a coolant loop routed through a traction battery, a battery chiller, a power electronics device, and a radiator. The system also includes a battery bypass valve in the coolant loop configured to, in a bypass position, bypass the traction battery and the battery chiller. The system includes a controller programmed to, in response to a demand for cabin cooling being greater than a predetermined demand, operate the battery bypass valve in the bypass position.

19 Claims, 3 Drawing Sheets

(56) References Cited

U.S. PATENT DOCUMENTS

| | | | |
|---|---|---|---|
| 2012/0225341 A1* | 9/2012 | Major | B60H 1/00278 |
| | | | 429/120 |
| 2012/0297809 A1* | 11/2012 | Carpenter | B60L 1/003 |
| | | | 62/244 |
| 2013/0269911 A1* | 10/2013 | Carpenter | F28D 1/0408 |
| | | | 165/104.13 |

* cited by examiner

OPERATION OF COMBINED COOLING CIRCUIT FOR POWER ELECTRONICS AND BATTERY

TECHNICAL FIELD

This application generally relates to a thermal management system for a traction battery and power electronics components in a hybrid vehicle.

BACKGROUND

A vehicle includes components and systems that require temperature management. For example, temperature of an engine is regulated by flowing coolant through the engine and using a radiator to reduce the temperature of the coolant. Hybrid vehicles include additional components for which temperature management is beneficial. For example, performance of traction batteries and power electronics modules may depend on maintaining the temperatures below a maximum limit. Additional cooling systems may be installed in the vehicle to provide thermal management for traction batteries and power electronics modules.

SUMMARY

A vehicle includes a coolant loop including a traction battery, a battery chiller, a power electronics device, and a radiator. The vehicle further includes a battery bypass valve in the coolant loop configured to, in a bypass position, bypass the traction battery and the battery chiller. The vehicle further includes a controller programmed to, in response to a demand for cabin cooling being greater than a predetermined demand, operate the battery bypass valve in the bypass position.

A thermal management system for a vehicle includes a controller programmed to, in response to a battery temperature being less than a predetermined temperature, command a battery bypass valve coupled to a coolant loop, having a battery path including a traction battery and a battery chiller, an electronics path including a power electronics device, and a radiator path including a radiator, to flow coolant to the battery path and command a radiator bypass valve coupled to the coolant loop to bypass the radiator.

A method includes operating, by a controller, a battery bypass valve disposed in a cooling loop having a battery path including a traction battery and a battery chiller, an electronics path including a power electronics device, and a radiator path including a radiator in a bypass mode to bypass the battery path in response to a demand for cabin cooling exceeding a predetermined demand.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
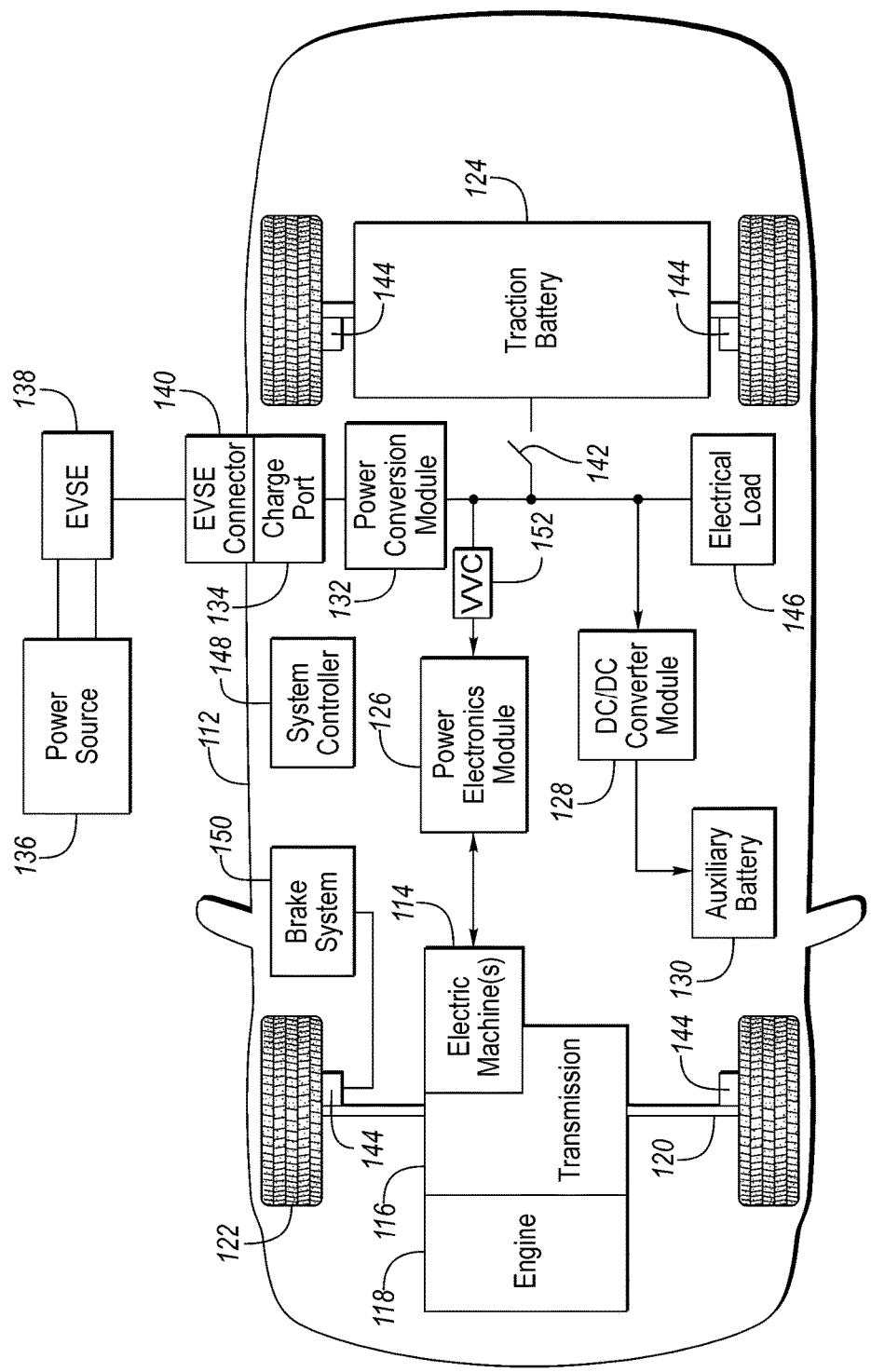
FIG. 1 is a diagram of an electrified vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
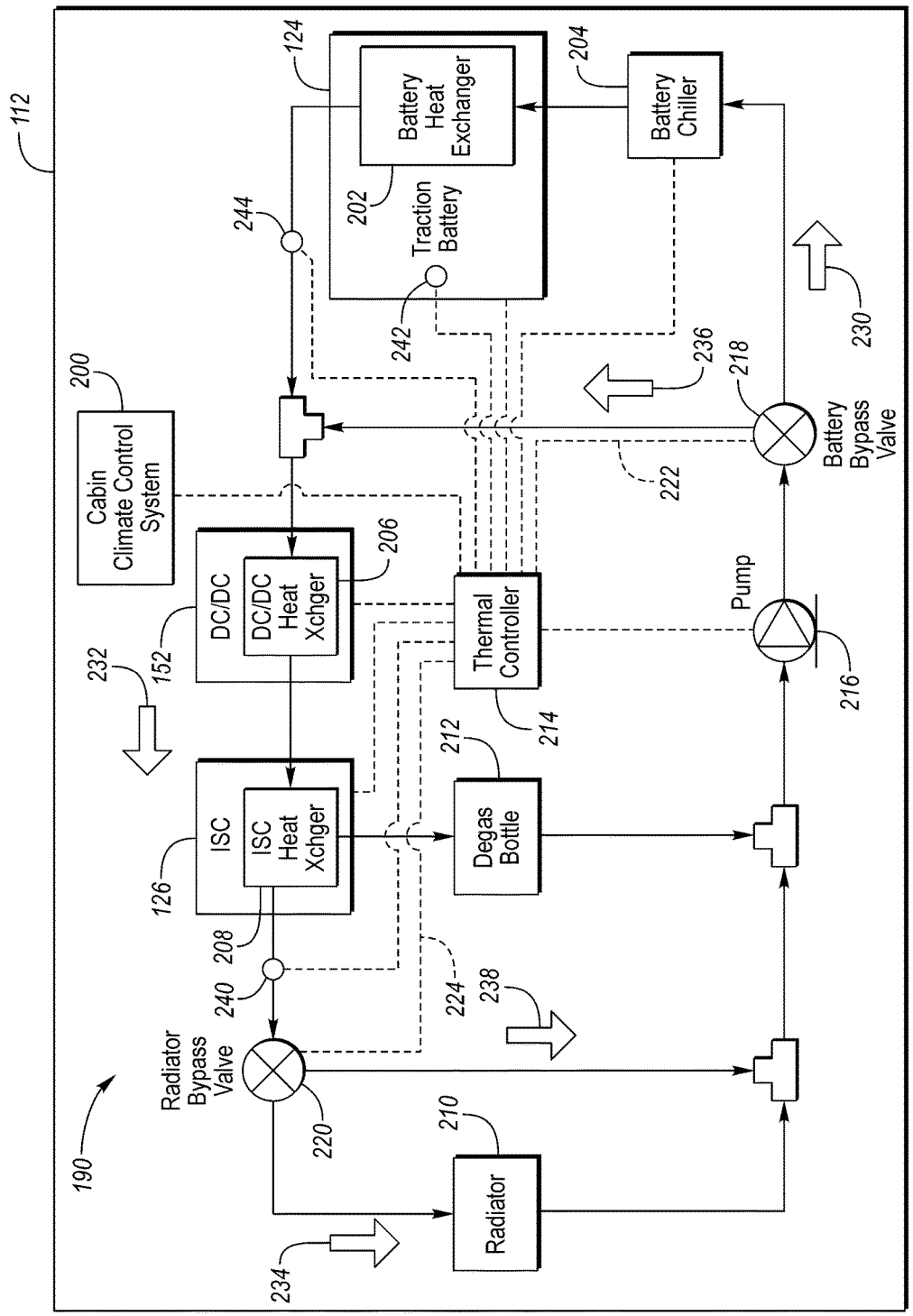
FIG. 2 is a diagram of a cooling loop in an electrified vehicle.

The vehicle 112 may include a thermal management system for controlling the temperature of the traction battery 124 and power electronics modules (e.g., 126, 152). FIG. 2 depicts a diagram for a portion of the thermal management system for the electrified vehicle 112. The vehicle 112 may include a coolant loop 190 that is configured to route a coolant to power electronics modules (e.g., 126, 152) and the traction battery 124 for thermal management. The thermal management system may include the components and subsystems described herein.

The vehicle 112 may include a cabin climate control system 200. The cabin climate control system 200 may be configured to provide heating and cooling for the cabin of the vehicle 112. In a typical configuration, coolant that flows through the engine 118 to remove heat from the engine 118 is flowed through a heater core. In other configurations, the coolant may be heated by an electrical heater (e.g., electric vehicle). The heater core transfers heat from the coolant to air around the heater core which may be forced into the cabin with a variable speed fan.

Cabin cooling may be accomplished with an air conditioning system. The air-conditioning system may include various components including a compressor, a condenser, a dryer and an evaporator. The air-conditioning components may be coupled via tubes or pipes that facilitate transport of a refrigerant between the components. The compressor may be configured to raise the pressure of the refrigerant. The coolant may flow to a condenser that is configured to remove heat from the refrigerant. The refrigerant may be passed through an expansion valve that lowers the pressure of the refrigerant. The refrigerant may then pass through the evaporator that transfers heat from the surrounding air to the refrigerant. The temperature of the air that passes across the evaporator decreases. For cabin cooling, a fan may draw cabin air across the evaporator to facilitate the heat transfer.

The cabin climate control system 200 may include a cabin thermal controller that manages and controls operation of the various components of the cabin climate control system 200. The cabin thermal controller may receive inputs from the occupants such as a cabin temperature setpoint, a temperature setpoint for air provided by the cabin climate control system 200, and a desired fan speed. The cabin climate control system 200 may include one or more temperature sensors. For example, a temperature sensor may provide a temperature measurement for the cabin. The cabin thermal controller may receive the temperature sensor inputs and control the cabin temperature to the desired cabin temperature setpoint. The cabin cooling system may include a manual mode of operation in which the occupants control the speed of the fan and the temperature of the air entering the cabin.

In addition to controlling the climate in the cabin, various other vehicle components benefit by control of the temperature. For example, the traction battery 124 may perform best in a particular temperature range. The optimal temperature range may affect the battery power capability and the battery life. By operating within the temperature range, battery life and capability may be maintained. In addition, the temperature of the power electronics module 126 and the VVC 152 may be maintained below a predetermined limit temperature to prolong the useful life of these components.

A typical hybrid vehicle places the high-voltage electronic modules (e.g., 126, 152) and the traction battery 124 in separate coolant loops. For optimal battery performance, the traction battery 124 may need to be operated at a lower temperature than the high-voltage electronic modules.

The configuration described herein is configured with the high-voltage power electronics (e.g., power electronics module 126, VVC 152) and the traction battery 124 in the same coolant loop. Such a configuration reduces cost as additional components such as pumps, cooling lines, and valves are not present. In addition, vehicle weight is reduced since fewer components are used.

The thermal management system of the vehicle 112 may include a coolant loop 190 that is configured to route coolant through the power electronics module 126, the VVC 152, and the traction battery 124. The coolant loop 190 may include pipes, lines, tubes, and connectors through which the coolant may flow. The coolant loop 190 may include a number of paths through which coolant may be flowed. The paths through which coolant may flow may be controlled by various valves to be described herein. Each of the paths may include any conduits and connections as necessary to facilitate the flow of coolant through the associated path.

The traction battery 124 may include a battery heat exchanger 202 that is configured to transfer heat to and from the traction battery 124. The battery heat exchanger 202 may transfer heat between the traction battery 124 and a coolant flowing through the battery heat exchanger 202. The battery heat exchanger 202 may transfer heat from the coolant to the traction battery 124 if the coolant temperature is greater than the traction battery temperature. The battery heat exchanger 202 may transfer heat from the traction battery 124 to the coolant if the coolant temperature is less than the traction battery temperature.

The thermal management system of the vehicle 112 may include a battery chiller 204. The battery chiller 204 may operate in a manner similar to the air-conditioning system. That is, a compressor may compress refrigerant which is passed through an evaporator that is in contact with coolant flowing through the system. Some surfaces of the evaporator may be in contact with the coolant in the coolant circuit. As the refrigerant passes through the evaporator, the coolant in the coolant circuit is cooled. The evaporator of the battery chiller 204 may receive refrigerant from the same compressor as the air-conditioning system. For example, one or more valves may be present in the refrigerant lines to direct refrigerant to the air-conditioning system and/or the battery chiller 204. The battery chiller 204 operates to reduce the temperature of the coolant entering the battery heat exchanger 202.

During operation, a high-voltage power electronics module (e.g., inverter 126, DC/DC converter 128, VVC 152) generates heat. In order to protect the switching devices within the module, heat must be removed. A common method of cooling the modules is to transfer the generated heat to a coolant that flows through the module. For example, heat from the switching devices may be transferred to a heat sink that is thermally coupled to the switching devices. The heat sink is generally constructed of a material having a high thermal conductivity. The heat sink may be coupled to a heat exchanger which transfers heat from the heat sink to a coolant that flows through heat exchanger. The high-voltage power electronics modules include the VVC 152 and the power electronics module 126. In some configuration, the DC/DC converter module 128 may be included in the coolant loop.

The VVC 152 may include a VVC heat exchanger 206 that is configured to transfer heat to and from the VVC 152. The VVC heat exchanger 206 may transfer heat between the VVC 152 and a coolant flowing through the VVC heat exchanger 206. The VVC heat exchanger 206 may transfer heat from the coolant to the VVC 152 when the coolant temperature is greater than the VVC temperature. The VVC heat exchanger 206 may transfer heat from the VVC 152 to the coolant when the coolant temperature is less than the VVC temperature.

The power electronics module 126 may also be referred to an inverter system controller (ISC) and may include an ISC heat exchanger 208 that is configured to transfer heat to and from the ISC 126. The ISC heat exchanger 208 may transfer heat between the ISC 126 and a coolant flowing through the ISC heat exchanger 208. The ISC heat exchanger 208 may transfer heat from the coolant to the ISC 126 when the coolant temperature is greater than the ISC temperature. The ISC heat exchanger 208 may transfer heat from the ISC 126 to the coolant when the coolant temperature is less than the ISC temperature.

The thermal management system of the vehicle 112 may include a degas bottle 212 coupled to one of the heat exchangers. For example, the degas bottle 212 may be coupled to the ISC heat exchanger 208. The degas bottle allows for the collection of coolant so that air bubbles that are trapped in the coolant may be released from the coolant. Coolant that flows into the degas bottle may be routed back into the coolant loop 190.

The coolant loop 190 may define a power electronics path 232 that routes coolant through the power electronics devices. In this example, the power electronics path 232 routes coolant through the VVC heat exchanger 206 and the ISC heat exchanger 208. The coolant loop 190 may define a battery path 230 that routes coolant through the traction battery 124 and the battery chiller 204.

The thermal management system of the vehicle 112 may include a pump 216 that is configured to cause coolant to flow in the coolant loop 190. The pump 216 may include an electric motor that is configured to operate a pumping mechanism. The electric motor may be controlled by adjusting a voltage or current input to cause rotation at a desired speed. In some configurations, the electric motor may be configured to operate at variable speeds to vary the flow rate of coolant through the coolant loop 190. The operation of the coolant loop 190 may be such that coolant flowing through the coolant loop 190 may traverse through selected paths and return to the pump 216 for continued recirculation through the coolant loop 190.

The thermal management system of the vehicle 112 may include a thermal controller 214 that is configured to control and manage operation of the coolant loop 190. The thermal controller 214 may include a processor and memory for implementing the control instructions and storing parameters. In addition, the thermal controller 214 may include input/output (I/O) interfaces configured to receive feedback signals and output control signals to various control devices. Note that the functions implemented by the thermal controller 214 may be incorporated into another controller in the vehicle (e.g. system controller 148).

The thermal management system of the vehicle 112 may include a radiator 210 within the coolant loop 190. The coolant loop 190 may define a radiator path 234 that routes coolant through the radiator 210. The radiator 210 may be configured to transfer heat from the coolant to the air. As coolant flows through the radiator 210 heat from the coolant is transferred to air passing by the radiator 210. The radiator 210 may include a series of tubes through which coolant flows from one side of the radiator 210 to another side. In between the tubes and in contact with adjacent tubes may be metal formed in a corrugated pattern that increases a surface area for heat transfer. Coolant exiting the radiator 210 is generally at a lower temperature than coolant entering the radiator 210.

The thermal management system of the vehicle 112 may include a battery bypass valve 218 that is configured to selectively route coolant in the coolant loop 190 to the battery path 230 that includes the traction battery 124 and the battery chiller 204 or a battery bypass path 236 that bypasses the traction battery 124 and the battery chiller 204. The battery bypass valve 218 may include a solenoid coupled to a valve mechanism such that a position of the battery bypass valve 218 may be controlled by the thermal controller 214. For example, a battery bypass valve control signal 222 may be output from the thermal controller 214 to control the position of the battery bypass valve 218. Using the battery bypass valve control signal 222, the thermal controller 214 may command the position of the battery bypass valve 218.

The thermal management system of the vehicle 112 may include temperature sensors that are placed in various locations to measure component and/or coolant temperatures. An electronics path temperature sensor 240 may be configured to measure a temperature of coolant in the electronics path 232. For example, the electronics path temperature sensor 240 may be located near the coolant output of the ISC 126. Note that additional temperature sensors may be present. A battery path temperature sensor 244 may be configured to measure a temperature of coolant in the battery path 230. For example, the battery path temperature sensor 244 may be located near the coolant output of the traction battery 124. In addition, a traction battery temperature sensor 242 may be configured to measure a temperature associated with the traction battery 124. For example, the traction battery temperature sensor 242 may measure a temperature at a location within the traction battery 124 that is indicative of a temperature of cells that make up the traction battery 124. Each of the temperature sensors may be electrically coupled to a controller. For example, each of the temperature sensors may be electrically coupled to the thermal controller 214. In other configurations, the thermal controller 214 may receive temperature information from the temperature sensors via the vehicle network (e.g., CAN bus).

When controlled to a first position (e.g., battery flow position), the battery bypass valve 218 may route coolant to the battery path 230 which includes the battery chiller 204 and the battery heat exchanger 202. When controlled to a second position (e.g., battery bypass position), the battery bypass valve 218 may route coolant to the battery bypass path 236 to bypass the battery chiller 204 and the battery heat exchanger 202.

The thermal management system of the vehicle 112 may include a radiator bypass valve 220 that is configured to selectively route coolant in the coolant loop 190 to the radiator path 234 that includes the radiator 210 or a radiator bypass path 238 that bypasses the radiator 210. The radiator bypass valve 220 may include a solenoid coupled to a valve mechanism such that a position of the radiator bypass valve 220 may be controlled by the thermal controller 214. For example, a radiator bypass valve control signal 224 may be output from the thermal controller 214 to control the position of the radiator bypass valve 220. Using the radiator bypass valve control signal 224, the thermal controller 214 may command the position of the radiator bypass valve 220.

When controlled to a first position (e.g., radiator flow position), the radiator bypass valve 220 may route fluid to the radiator path 234 which includes the radiator 210. When controlled to a second position (e.g., radiator bypass position), the radiator bypass valve 220 may route fluid to the radiator bypass path 238 to bypass the radiator 210. This mode may be useful during a vehicle cold start. During startup, the traction battery 124 may be at a temperature that is below an optimal operating temperature range. In this mode, heat generated by the ISC 126 and the VVC 152 may be used to heat the coolant without passing through the radiator 210 which would reduce the coolant temperature.

The combined operational modes of the radiator bypass valve 220 and the battery bypass valve 218 defines a number of cooling modes. A battery/radiator mode may be defined when the radiator bypass valve 220 is commanded to a position to flow coolant to the radiator 210 (e.g., the radiator path 234) and the battery bypass valve 218 is commanded to a position to flow coolant to the battery chiller 204 and the battery heat exchanger 202 (e.g., the battery path 230). In the battery/radiator mode, the coolant flows through the battery chiller 204, the battery heat exchanger 202, the VVC heat exchanger 206, the ISC heat exchanger 208 and the radiator 210. The battery chiller 204 may be operated to reduce the coolant temperature that enters the battery heat exchanger 202.

A battery cold start heating mode may be defined when the radiator bypass valve 220 is commanded to a position to bypass the radiator 210 (e.g., the radiator bypass path 238) and the battery bypass valve 218 is commanded to a position to flow coolant to the battery chiller 204 and the battery heat exchanger 202 (e.g. the battery path 230). The battery cold start heating mode may be initiated when the battery temperature is less than an optimal operating temperature range. The battery cold start heating mode may be initiated when a coolant temperature is less than a predetermined temperature. In this mode, heat transferred to the coolant from the ISC heat exchanger 208 and the VVC heat exchanger 206 may be used to heat the traction battery 124. By bypassing the radiator 210, the temperature of the coolant is not decreased by flowing through the radiator 210. In this manner, the traction battery 124 may be heated to the optimal operating range in a shorter amount of time.

A battery bypass mode may be defined when the radiator bypass valve is commanded to a position to flow coolant to the radiator 210 (e.g., the radiator path 234) and the battery bypass valve is commanded to a position to bypass the battery chiller 204 and the battery heat exchanger 202 (e.g., the battery bypass path 236). In this mode, the coolant flows through the VVC heat exchanger 206, the ISC heat exchanger 208, and the radiator 210. The battery chiller 204 and the battery heat exchanger 202 are excluded from the coolant flow. In this mode, the temperature of the VVC 152 and the ISC 126 are regulated by the coolant flowing through the radiator 210. That is, heat generated in the VVC 152 and the ISC 126 is dissipated in the radiator 210 to prevent the VVC 152 and the ISC 126 from overheating. The temperature of the traction battery 124 is regulated by the thermal capacity of the traction battery 124.

The battery bypass mode of operation may be entered when there is a demand for cabin cooling by the cabin climate control system 200. During hot days, cooling the cabin may be prioritized if the temperature of the traction battery 124 is not greater than a predetermined limit temperature. During these conditions, it may be preferable to supply refrigerant to the cabin air-conditioning system to reduce the cabin temperature. This may limit the amount of refrigerant that can be supplied to the battery chiller 204 during this time. Once the cabin cooling demand has been satisfied the battery bypass valve 218 may be switched to the battery path 230.

The battery/radiator bypass mode may be defined when the radiator bypass valve 220 is switched to bypass the radiator 210 (e.g., radiator bypass path 238) and the battery bypass valve 218 is switched to bypass the battery chiller 204 and the battery heat exchanger 202 (e.g., the battery bypass path 236). This mode may be used to warm up the ISC 126 and the VVC 152 during cold start conditions.

The thermal controller 214 may be in communication with the cabin climate control system 200 (e.g., via CAN network). The thermal controller 214 may receive signals indicative of the state of the cabin climate control system 200. For example, the thermal controller 214 may receive a signal indicative of the level of requested cabin cooling demand. The thermal controller 214 may receive a signal indicative of the actual level of cabin cooling. For example, these values may be temperatures such as a setpoint temperature and an actual cabin temperature.

The cabin cooling demand may also be represented as a power demand from the cabin climate control system 200. For example, an operating level or power consumption value of the air-conditioning compressor may be measured or estimated. The power consumption value may also include a fan speed or fan power consumption value as well. For example, a higher fan speed for the cabin climate control system 200 during a demand for cabin cooling may be indicative of an increased demand for cabin cooling.

The cabin cooling demand may also be inferred by an operating mode of the cabin climate control system 200. For example, the cabin climate control system 200 may include a "MAX A/C" mode in which the cabin air is recirculated through the cabin. In the "MAX A/C" mode, it may be desirable to prioritize cabin cooling.

Conditions for exiting the battery bypass mode may include the cabin cooling demand being satisfied. For example, the system may exit the battery bypass mode when the cabin cooling demand has fallen below a threshold value. In addition, the battery bypass mode may be exited after expiration of a predetermined time in the battery bypass mode. This may provide a backup condition for exiting the battery bypass mode if the cabin cooling cycle was extended. In addition, the battery bypass mode may be exited if the temperature of the traction battery 124 is greater than a predetermined temperature. The predetermined temperature may be a maximum recommended operating temperature for the traction battery 124. The temperature condition helps to prevent the traction battery 124 from reaching an over-temperature condition.

The battery cold start heating mode may be entered when a battery temperature is less than a predetermined temperature. In addition, the coolant temperature at an output of the ISC heat exchanger 208 may be monitored. The entry to the battery cold start heating mode may be further conditioned on the coolant temperature at the ISC heat exchanger output being greater than a predetermined threshold. In addition, the entry may be conditioned on the temperature at the ISC heat exchanger output being greater than a temperature of the traction battery 124. This condition may help to ensure that the coolant is warm enough to provide heating to the traction battery 124. Conditions for exiting the battery cold start may include the battery temperature exceeding a predetermined temperature. For example, the predetermined temperature may be a temperature that is within an optimal temperature operating range for the traction battery 124.

Figure 3:
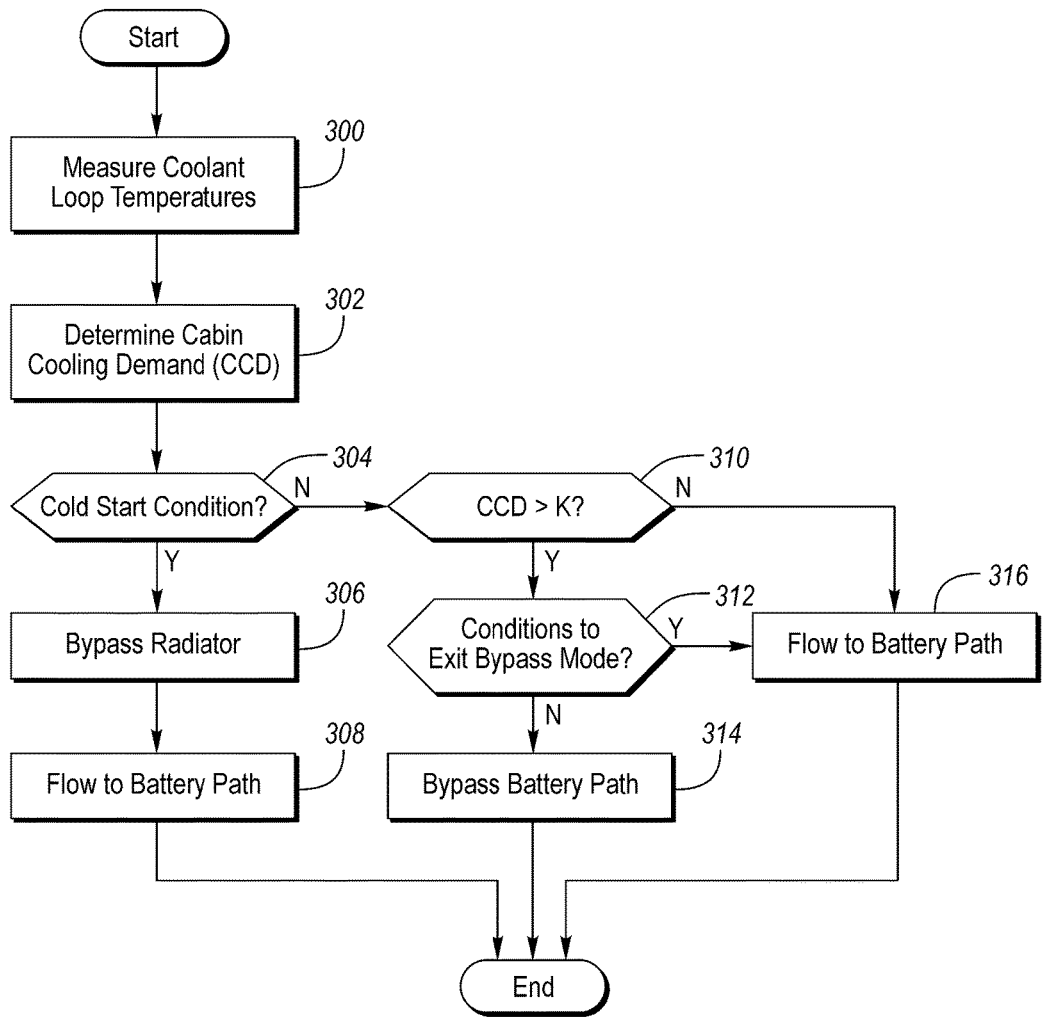
FIG. 3 is a flow chart of a possible sequence of operations for controlling a thermal management system.

FIG. 3 depicts a flowchart for a possible sequence of operations that may be implemented in a controller (e.g., thermal controller 214) to control operation of the thermal management system. For example, the operations may be implemented and executed in the thermal controller 214. At operation 300, temperatures in the coolant loop may be measured or estimated. An electronics path temperature sensor may measure a coolant temperature at a coolant output of the ISC 126. A battery temperature sensor may measure a temperature of the traction battery 124. A battery coolant temperature sensor may measure a temperature of coolant in the battery path 230. The thermal controller 214 may receive signals representing each of the measured temperatures.

At operation 302, the cabin cooling demand may be estimated or measured. The cabin cooling demand may be determined based on an operating mode of the cabin climate control system 200 (e.g., in a "MAX A/C" mode). The cabin cooling demand may be determined based on a power demand of the air-conditioning compressor.

At operation 304, the controller may check for a cold-start condition. The cold-start condition may be satisfied when a temperature of coolant in the electronics path 232 is less than a predetermined temperature. For example, the predetermined temperature may be a temperature that is less than a normal operating temperature of the high-voltage power electronics modules (e.g., 126, 152) that are in the electronics path 232. The cold-start condition may be satisfied when a battery temperature is less than a predetermined temperature threshold. If the cold-start condition is satisfied, operation 306 may be executed. At operation 306, the radiator bypass valve may be controlled to a radiator bypass position to prevent coolant flow to the radiator 210. At operation 308, the battery bypass valve may be controlled to a battery flow position to flow coolant to the battery path 230.

If the cold-start condition is not satisfied, operation 310 may be executed. At operation 310, the cabin cooling demand is compared to a predetermined demand level. If the cabin cooling demand is less than or equal to the predetermined demand level, operation 316 may be executed. At operation 316, the battery bypass valve is controlled to the battery flow position.

If the cabin cooling demand is greater than the predetermined demand level, operation 312 may be executed. At operation 312, conditions to exit the bypass mode are checked. Conditions to exit the bypass mode may include a battery temperature exceeding a predetermined limit temperature. The predetermined limit temperature may be a temperature above which battery cooling is needed to optimize battery operation and/or life. Conditions to exit the bypass mode may include expiration of a predetermined period of time. If the conditions to exit the bypass mode are satisfied, operation 316 is executed to control the battery bypass valve to the battery flow position. If the conditions to exit the bypass mode are not satisfied, operation 314 is executed. At operation 314, the battery bypass valve is controlled in the bypass mode to prevent coolant flow to the battery path 230. The sequence of operations may be periodically repeated to maintain control of the valves as operating conditions change.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a coolant loop including a traction battery, a battery chiller, a power electronics device, and a radiator;
a battery bypass valve in the coolant loop configured to, in a bypass position, bypass the traction battery and the battery chiller; and
a controller programmed to, in response to a demand for cabin cooling being greater than a predetermined demand, command the battery bypass valve to the bypass position.

2. The vehicle of claim 1 wherein the controller is further programmed to, in response to the demand for cabin cooling falling below a second predetermined demand, command the battery bypass valve to a battery flow position to flow coolant to the traction battery and the battery chiller.

3. The vehicle of claim 1 wherein the controller is further programmed to, in response to a battery temperature being greater than a predetermined temperature, command the battery bypass valve to a battery flow position to flow coolant to the traction battery and the battery chiller.

4. The vehicle of claim 1 wherein the controller is further programmed to, in response to bypassing the traction battery and the battery chiller for greater than a predetermined time, command the battery bypass valve to a battery flow position to flow coolant to the traction battery and the battery chiller.

5. The vehicle of claim 1 wherein the demand for cabin cooling is based on a mode of operation of a cabin climate control system.

6. The vehicle of claim 1 wherein the demand for cabin cooling is based on a power demand for an air-conditioning system.

7. The vehicle of claim 1 further comprising a radiator bypass valve in the coolant loop configured to, in a radiator flow position, route coolant through the radiator and, in a radiator bypass position, bypass the radiator.

8. The vehicle of claim 7 wherein the controller is further programmed to, in response to a coolant temperature in the coolant loop being less than a predetermined temperature, command the radiator bypass valve to the radiator bypass position and command the battery bypass valve to a battery flow position.

9. The vehicle of claim 8 wherein the controller is further programmed to, in response to a coolant temperature associated with the power electronics device being greater than a predetermined temperature, command the radiator bypass valve to the radiator flow position.

10. A thermal management system for a vehicle comprising:
a controller programmed to, in response to a battery temperature being less than a predetermined temperature, command a battery bypass valve coupled to a coolant loop, having a battery path including a traction battery and a battery chiller, an electronics path including a power electronics device, and a radiator path including a radiator, to flow coolant to the battery path and command a radiator bypass valve coupled to the coolant loop to bypass the radiator.

11. The thermal management system of claim 10 wherein the controller is further programmed to, in response to a demand for cabin cooling exceeding a predetermined demand, command the battery bypass valve to bypass the battery path.

12. The thermal management system of claim 11 wherein the demand for cabin cooling is based on a mode of operation of a cabin climate control system.

13. The thermal management system of claim 11 wherein the demand for cabin cooling is based on a power demand for an air-conditioning system.

14. The thermal management system of claim 11 wherein the controller is further programmed to, in response to the demand for cabin cooling falling below a second predetermined demand, command the battery bypass valve to flow coolant to the battery path.

15. The thermal management system of claim 10 wherein the controller is further programmed to, in response to the battery temperature rising above a second predetermined temperature, command the radiator bypass valve to flow coolant to the radiator path.

16. A method comprising:
operating, by a controller, a battery bypass valve disposed in a cooling loop, having a battery path including a traction battery and a battery chiller, an electronics path including a power electronics device, and a radiator path including a radiator, in a bypass mode to bypass the battery path in response to a demand for cabin cooling exceeding a predetermined demand.

17. The method of claim 16 further comprising operating, by the controller, the battery bypass valve in a battery flow mode to flow coolant to the battery path in response to the demand for cabin cooling falling below a second predetermined demand.

18. The method of claim 16 further comprising operating, by the controller, a radiator bypass valve in a radiator bypass mode in response to a temperature in the cooling loop being less than a predetermined temperature.

19. The method of claim 18 further comprising operating, by the controller, the radiator bypass valve in a radiator flow mode in response to a temperature in the cooling loop being greater than a second predetermined temperature.

* * * * *